US012808201B2

(12) United States Patent
Fan et al.

(10) Patent No.: US 12,808,201 B2
(45) **Date of Patent: *Nov. 24, 2026**

(54) POLYMERIC-BASED BUILDING MATERIALS

(71) Applicant: The AZEK Group LLC, Chicago, IL (US)

(72) Inventors: Jia Fan, Wilmington, OH (US); David Joel Parker, Jr., Middleville, MI (US)

(73) Assignee: The AZEK Group LLC, Chicago, IL (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/761,066

(22) Filed: Jul. 1, 2024

(65) Prior Publication Data

US 2024/0352743 A1 Oct. 24, 2024

Related U.S. Application Data

(63) Continuation of application No. 17/032,065, filed on Sep. 25, 2020, now Pat. No. 12,054,955.

(60) Provisional application No. 62/906,480, filed on Sep. 26, 2019.

(51) Int. Cl.

| | |
|---|---|
| ***E04F 13/08*** | (2006.01) |
| ***C08J 5/04*** | (2006.01) |
| ***C08K 7/10*** | (2006.01) |
| ***C08L 27/06*** | (2006.01) |
| ***E04F 13/16*** | (2006.01) |

(52) U.S. Cl.
CPC ......... *E04F 13/0864* (2013.01); *C08J 5/0405* (2021.05); *C08K 7/10* (2013.01); *C08L 27/06* (2013.01); *E04F 13/16* (2013.01); *C08J 2327/06* (2013.01); *C08J 2451/00* (2013.01)

(58) Field of Classification Search
CPC ........ E04F 13/0864; E04F 13/16; C08K 7/10; C08L 27/06; C08J 5/044
USPC .......................................................... 428/156
See application file for complete search history.

(56) References Cited

U.S. PATENT DOCUMENTS 3,009,823 A * 11/1961 Drelich .................... D04H 1/66 428/156
5,323,581 A * 6/1994 Jakel ......................... E04D 1/04 52/541
2006/0101768 A1* 5/2006 Watson ............... E04F 13/0864 52/578
2016/0244598 A1* 8/2016 Stanhope ................ B32B 27/32

FOREIGN PATENT DOCUMENTS

EP 3412640 A1 * 12/2018 ........... C04B 35/622

* cited by examiner

*Primary Examiner* — Tahseen Khan
(74) *Attorney, Agent, or Firm* — Shook, Hardy & Bacon L.L.P.

(57) ABSTRACT

Polymeric-based building materials are disclosed. The polymeric-based building materials can include opposing inner and outer surfaces, with a recessed portion on the inner surface that is positioned between a first contacting portion and a second contacting portion. The surface of the second contacting portion can be angled with respect to the surface of the first contacting portion.

11 Claims, 5 Drawing Sheets

POLYMERIC-BASED BUILDING MATERIALS

CROSS-REFERENCE TO RELATED APPLICATIONS

This application claims priority to U.S. Non-Provisional application Ser. No. 17/032,065, filed Sep. 25, 2020, and entitled "POLYMERIC-BASED BUILDING MATERIALS," which claims priority to U.S. Provisional Application No. 62/906,480, filed Sep. 26, 2019, and entitled "POLYMERIC-BASED BUILDING MATERIALS," the entire contents of which are incorporated by reference herein.

TECHNICAL FIELD

The present disclosure relates to building materials. More particularly, the present disclosure relates to polymeric-based building materials.

BACKGROUND

Polymeric-based building materials provide a number of advantages over their natural counterparts, such as wood. For example, certain polymeric-based siding materials can exhibit increase durability and may require less maintenance than their wood counterparts. However, certain conventional polymeric-based siding materials lack sufficient dimensional stability, while other conventional polymeric-based siding materials exhibit a significant weight, making them undesirable for use.

BRIEF DESCRIPTION OF THE DRAWINGS

Illustrative aspects are described in detail below with reference to the attached drawing figures, which are incorporated by reference herein and wherein.

DESCRIPTION

Figure 1:
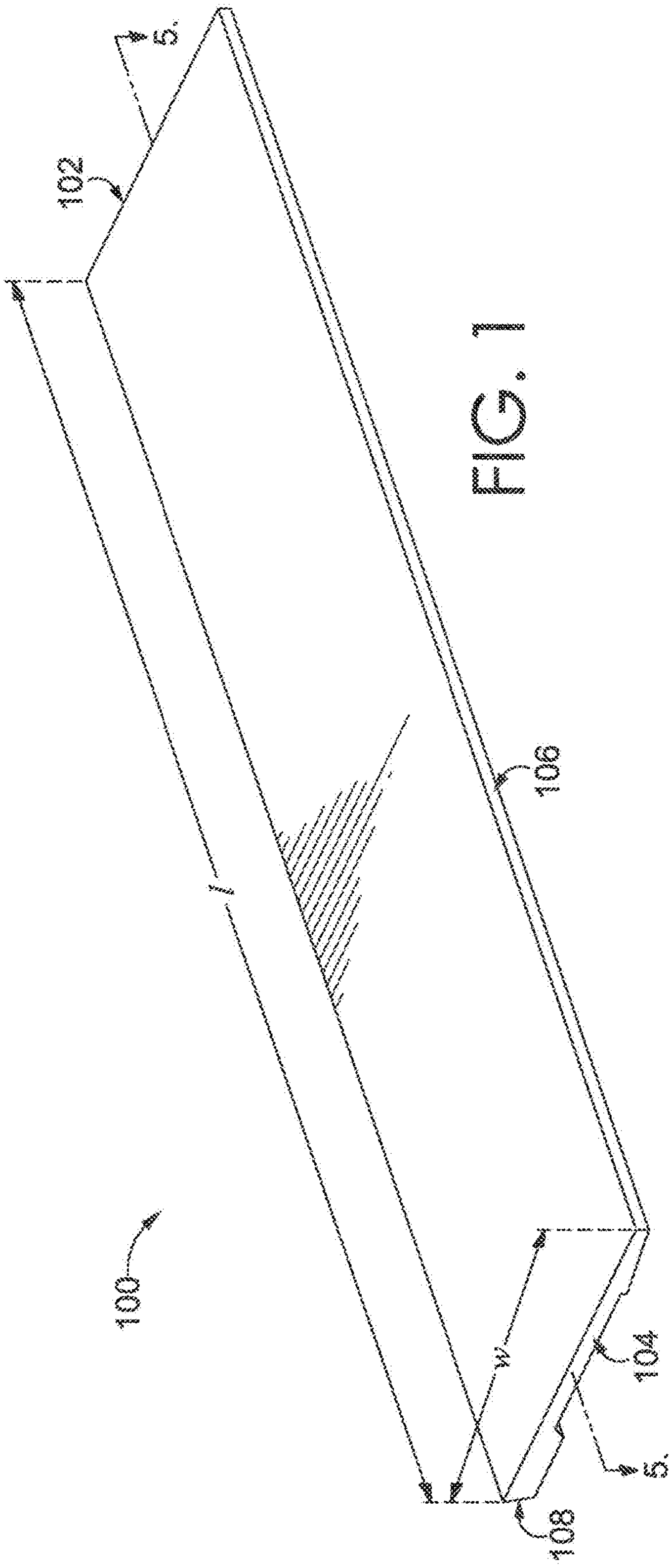
FIG. 1 is a top and side perspective view of a polymeric-based building material, in accordance with aspects hereof.

Aspects herein relate to polymeric-based building materials. Polymeric-based building materials, such as polymeric-based siding materials, can exhibit improved weatherization and may require less maintenance than their wood counterparts. However, certain conventional polymeric-based building materials may not be as desirable with respect to other relevant parameters. For instance, certain conventional polymeric-based siding materials lack sufficient dimensional stability, while other conventional polymeric-based siding materials exhibit a significant weight, making them undesirable for use.

The building materials disclosed herein can alleviate one or more of the issues described above. For instance in certain aspects, the polymeric-based building materials disclosed herein include a recessed portion on an inner surface that is positioned between two contacting portions. In such aspects as discussed below, these structural features, in addition to other features described herein, provide functional advantages. For example, including a recessed portion on an inner surface positioned between two contacting portions allows the building material to be in contact with an installation surface at both ends while also reducing excess material, helping to minimize its overall weight. Further, in such aspects as described below, the opposing outer surface of the building material may be substantially flat, with or without textured appearances, thereby providing an aesthetically pleasing viewable outer surface while the inner surface includes, in part, the recessed portion that can aid in minimizing the overall weight of the building material.

In various aspects, the inner and outer surfaces of the building materials disclosed herein are cooperatively configured to provide sufficient structural and dimensional functionality while further reducing the total amount and/or weight of the building material. For example in such aspects, in addition to a recessed portion on the inner surface, the polymeric-based siding materials disclosed herein may include a varied thickness at specific locations throughout the material, further reducing the total amount and/or weight of the siding material. As discussed in detail below, the inner surface can include first and second contacting surfaces flanking the recessed portion, where the maximum thickness of the material at the first contacting surface is less than the maximum thickness of the material at the second contacting surface. In aspects where the first and second contacting portions have varying thicknesses, the contacting surfaces of the first and second contacting portions are angled with respect to one another to accommodate this varied thickness, as discussed below. Further, in such aspects, the second or bottom contacting portion has a contacting surface that is substantially parallel to the outer surface, thereby allowing the building material to be seamlessly layered on top of one another when installed.

In further aspects discussed herein, the polymeric-based building materials may optionally include compositional components that may further enhance the dimensional stability of the building materials disclosed herein. For instance in aspects described below, the polymeric-based building material may include one or more additives, e.g., Wollastonite, in an amount between about 20 wt. % to about 60 wt. %, that may enhance the dimensional stability of the building materials, as compared to a polymeric-based material alone.

In further aspects, the building materials and the structural and material-based features disclosed herein are tailored to effectuate the desired functionality of low-weight and sufficient dimensional stability when manufactured in the size of a significant majority of building materials, such as siding that has a width within a range of 4-10 inches.

Accordingly, in one aspect a polymeric-based building material is provided. The polymer-based building material can include a top end and a bottom end, the bottom end positioned opposite the top end. The top end can be spaced apart from the bottom end by a distance of 2.5 inches to 10 inches. The polymeric-based building material can also include a left end, the left end extending from the top end to the bottom end and a right end, the right end positioned opposite the left end, and extending from the top end to the bottom end. The left end can be spaced apart from the right end by a distance of 6 feet to 18 feet. The polymeric-based building material can also include an outer surface extending from the top end to the bottom end and from the left end to the right end, where the outer surface defines a first horizontal plane. The polymeric-based building material can also include an inner surface extending from the top end to the bottom end and from the left end to the right end, where the inner surface includes a first contacting portion, a second contacting portion, and a recessed portion positioned between the first contacting portion and the second contacting portion, and where the second contacting portion has a second contacting surface that defines a second horizontal plane that is substantially parallel to the first horizontal plane of the outer surface.

In yet another aspect, a polymeric-based siding material is provided. The polymeric-based siding material can include a top end and a bottom end, the bottom end positioned opposite the top end, and where the top end is spaced apart from the bottom end by a distance of 2.5 inches to 10 inches. The polymeric-based siding material can also include a left end, the left end extending from the top end to the bottom end, and a right end, the right end positioned opposite the left end, and extending from the top end to the bottom end. The polymeric-based siding material can further include an outer surface extending from the top end to the bottom end and from the left end to the right end, where the outer surface defines a first horizontal plane. The polymeric-based siding material can also include an inner surface extending from the top end to the bottom end and from the left end to the right end, where the inner surface includes a first contacting portion, a second contacting portion, and a recessed portion positioned between the first contacting portion and the second contacting portion. The second contacting portion can have a second contacting surface that defines a second horizontal plane, where the first contacting portion has a first contacting surface that defines a third horizontal plane, and where the second horizontal plane is oriented with respect to the third horizontal plane at an angle $A_a$ of between 1° and 20°.

As used herein, the term "about" means plus or minus 10% of the numerical value of the number with which it is being used unless otherwise indicated or custom in the art dictates otherwise. Therefore, for example, "about 10 feet" includes the value 10 feet in addition to the range of 9 feet to 11 feet.

Figure 2:
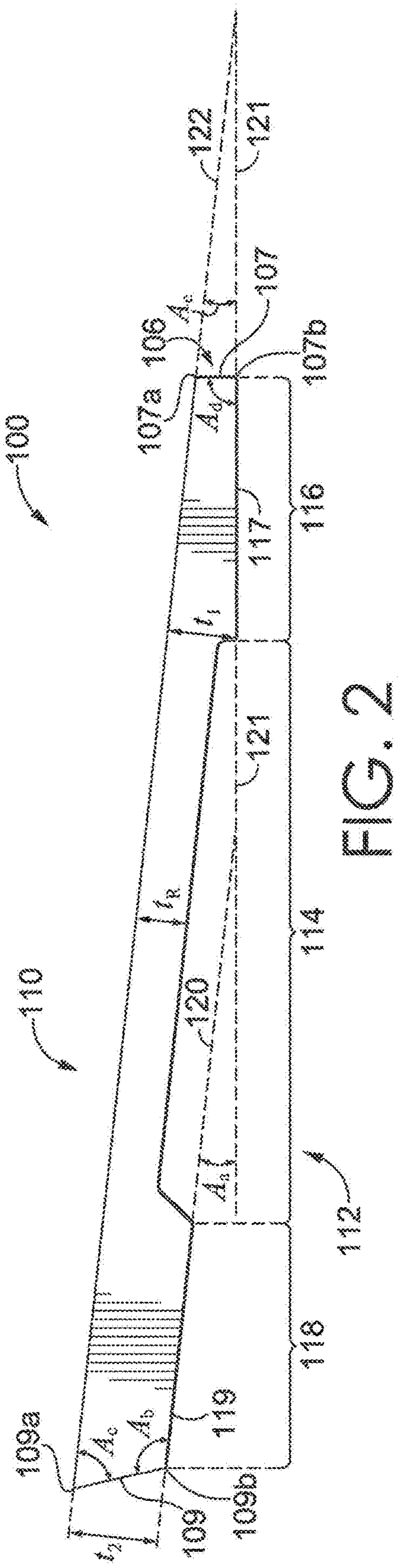
FIG. 2 is a side view of the polymeric-based building material of FIG. 1, particularly showing an outer surface and an inner surface, where the inner surface has a recessed portion between first and second contacting portions, in accordance with aspects hereof.

Turning now to the figures, and FIGS. 1 and 2 in particular, a polymeric-based building material 100 is depicted. It should be understood that the polymeric-based building material 100 depicted in FIG. 1 is just one example of a polymeric-based building material contemplated herein.

In various aspects, the polymeric-based building material 100 can be comprised of a polymeric composition having one or more polymeric resins and one or more additives. The polymeric composition is discussed in detail below.

In aspects, the polymeric-based building material 100 can be a polymeric-based siding material. In various aspects, the polymeric-based siding material can include a siding board or lap-siding board. As discussed further below with reference to the aspect depicted in FIG. 3, a polymeric-based siding material can be configured to be installed horizontally on a structure with one siding board overlapping a lower-positioned siding board. It should be understood that other types or forms of polymeric-based building materials are also contemplated herein, including but not limited to, cladding, trim, moulding, decking, railings, and fencing.

In aspects, the polymeric-based building material 100 generally includes a right end 102, a left end 104, a top end 106, and a bottom end 108. In various aspects, the right end 102 is spaced apart from the left end 104 by a distance or length 1 of about 6 feet to about 18 feet, about 7 feet to about 16 feet, or about 8 feet to about 14 feet; or about 18 feet, about 16 feet, or about 12 feet.

In certain aspects, the top end 106 is spaced apart from the bottom end 108 by a distance or width w of about 2.5 inches to about 10 inches, about 3 inches to about 9.5 inches, or about 3.5 inches to about 9 inches; or about 5.25 inches, about 7.25 inches, about 8.25 inches, or about 9.25 inches.

In aspects, the top end 106 can include a top surface 107 that extends from a first top edge **107*a* to a second top edge 107*b*. In the aspect depicted in FIG. 2, the top surface 107 can be oriented with respect to an inner surface 112 of the polymeric-based building material 100** at an angle $A_d$ of about 90°, or approximately 90°.

Figure 7:
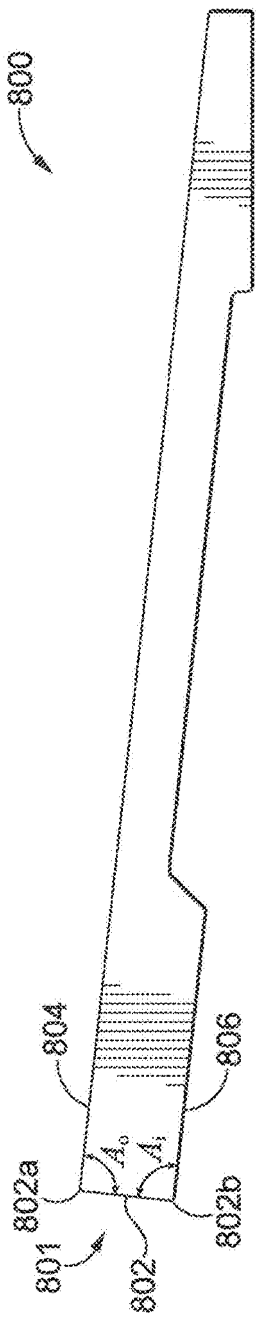
FIG. 7 is a side-view of another example polymeric-based building material, particularly showing that the bottom surface of the building material intersects the inner surface at an angle of about 90° or more, and showing that the bottom surface intersects the outer surface at an angle of about 90° or less, in accordance with aspects hereof.

In aspects, the bottom end 108 can include a bottom surface 109 extending from a first bottom edge **109*a* to a second bottom edge 109*b*. Further, in the aspect depicted in FIG. 2, the bottom end 108 includes an optional undercut feature, where the bottom end 108 is oriented with respect to an inner surface 112 of the polymeric-based building material 100 at an angle $A_b$ of greater than 90°, or greater than about 90°. In the same or alternative aspects, the bottom end 108 is oriented with respect to the outer surface 110 at an angle $A_a$ that is less than 90°, or less than about 90°. As indicated above, this undercut feature is an optional feature contemplated by aspects herein. An alternative aspect of a polymeric-based building material that does not include the undercut feature is depicted in FIG. 7. As can be seen in FIG. 7, the polymeric-based building material 800 is identical to the polymeric-based building material 100 of FIGS. 1 and 2, with the exception that the bottom surface 802 of the bottom end 801 of the polymeric-based building material 800 extends from a first bottom edge 802*a* to a second bottom edge 802*b*, where the bottom surface 802 is oriented with respect to the outer surface 804 at an angle $A_o$ of approximately 90°, or about 90°, and is oriented with respect to the inner surface 806 at an angle $A_i$ of about 90°, or approximately 90°. It should be understood that any or all of the parameters of the polymeric-based building material 100 discussed above with respect to FIGS. 1 and 2, except the angles $A_a$ and $A_b$, can apply to the polymeric-based building material 800 depicted in FIG. 7**.

In certain aspects, the outer surface 110 refers to the surface that is exposed upon installation of the polymeric-based building material 100. In certain aspects, the outer surface 110 can be substantially flat thereby providing an aesthetically pleasing exposed surface. In the same or alternative aspects, the outer surface 110 can be textured for aesthetic purposes, e.g., to mimic wood grain, while otherwise being substantially flat. As used herein, a substantially flat surface refers to a surface that extends from one end to another in a straight line with the exception that minor texture or other surface changes of less than 0.3 inches may be present.

As discussed above, in various aspects, the polymeric-based building materials disclosed herein may include a varied thickness at specific locations throughout the material, in order to reduce the total amount and/or weight of the siding material. For example, as best seen in the aspect depicted in FIG. 2, the inner surface 112 of the polymeric-based building material 100 can include a recessed portion 114 positioned between a first contacting portion 116 and a second contacting portion 118.

In the aspect depicted in FIG. 2, the thickness of the polymeric-based building material 100 from the inner surface 112 to the outer surface 110 varies at differing locations along the inner surface 112. For example, the maximum thickness $t_R$ between the inner surface 112 in the recessed portion 114 and the outer surface 110 is less than the maximum thickness $t_2$ between the inner surface 112 in the second contacting portion 118, also termed the second contacting surface 119, and the outer surface 110.

In aspects, the ratio $t_r$:$t_2$ of the maximum thickness $t_r$ between the inner surface 112 in the recessed portion 114 and the outer surface 110 to the maximum thickness $t_2$ between the second contacting surface 119 and the outer surface 110 is between 1:1.1 and 1:4, between 1:1.2 and 1:3, or between 1:1.3 and 1.2. In the same or alternative aspects, the maximum thickness $t_r$ between the inner surface 112 in the recessed portion 114 and the outer surface 110 is between 0.1 inches and 1 inch, between 0.15 inches and 0.6 inches, or between 0.2 inches and 0.4 inches.

As also seen in the aspect depicted in FIG. 2, the maximum thickness $t_2$ between the second contacting surface 119 and the outer surface 110 is greater than the maximum thickness $t_1$ between the outer surface 110 and the inner surface 112 in the first contacting portion 116, also termed the first contacting surface 117.

In aspects, the ratio $t_1$:$t_2$ of the maximum thickness $t_1$ between the first contacting surface 117 and the outer surface 110 to the maximum thickness $t_2$ between the second contacting surface 119 and the outer surface 110 is between 1:1.1 and 1:4, between 1:1.2 and 1:3, or between 1:1.3 and 1.2. In the same or alternative aspects, the maximum thickness $t_r$ between the inner surface 112 in the recessed portion 114 and the outer surface 110 is between 0.1 inches and 1 inch, between 0.15 inches and 0.6 inches, or between 0.2 inches and 0.4 inches.

In aspects where the polymeric-based building materials disclosed herein may include a varied thickness at specific locations throughout the material, such as in the aspect depicted in FIGS. 1 and 2, the second contacting surface 119 can be angled with respect to the first contacting surface 117 to accommodate this varied thickness when installed on a surface. For example, as can be seen in FIG. 2, the second contacting surface 119 can define a horizontal plane 120 and the first contacting surface can define a horizontal plane 121, where the horizontal plane 120 associated with the second contacting surface 119 is oriented with respect to the horizontal plane 121 associated with the first contacting surface 117 at an angle $A_a$ of between 1° and 20°, between 2° and 15°, or between 3° and 10°; or about 4°, about 5°, or about 6°. As will be discussed below with respect to FIG. 3, this angled orientation allows for the first contacting surface 117 to seamlessly contact the installation surface, while the second contacting surface 119 extends out from the installation surface in an angled manner so that it is properly oriented to interface with the outer surface of another adjacent building material.

In aspects, a horizontal plane 122 defined by the outer surface 110 can be substantially parallel to the horizontal plane 120 associated with the second contacting surface 119, which allows for a seamless interface when installing several of the polymeric-based building material 100 in an overlapping manner on an installation surface. Further in such aspects, the horizontal plane 122 associated with the outer surface 110 can be oriented with respect to the horizontal plane 121 associated with the first contacting surface 117 at an angle $A_e$ of between 1° and 20°, between 2° and 15°, or between 3° and 10°; or about 4°, about 5°, or about 6°.

Figure 3:
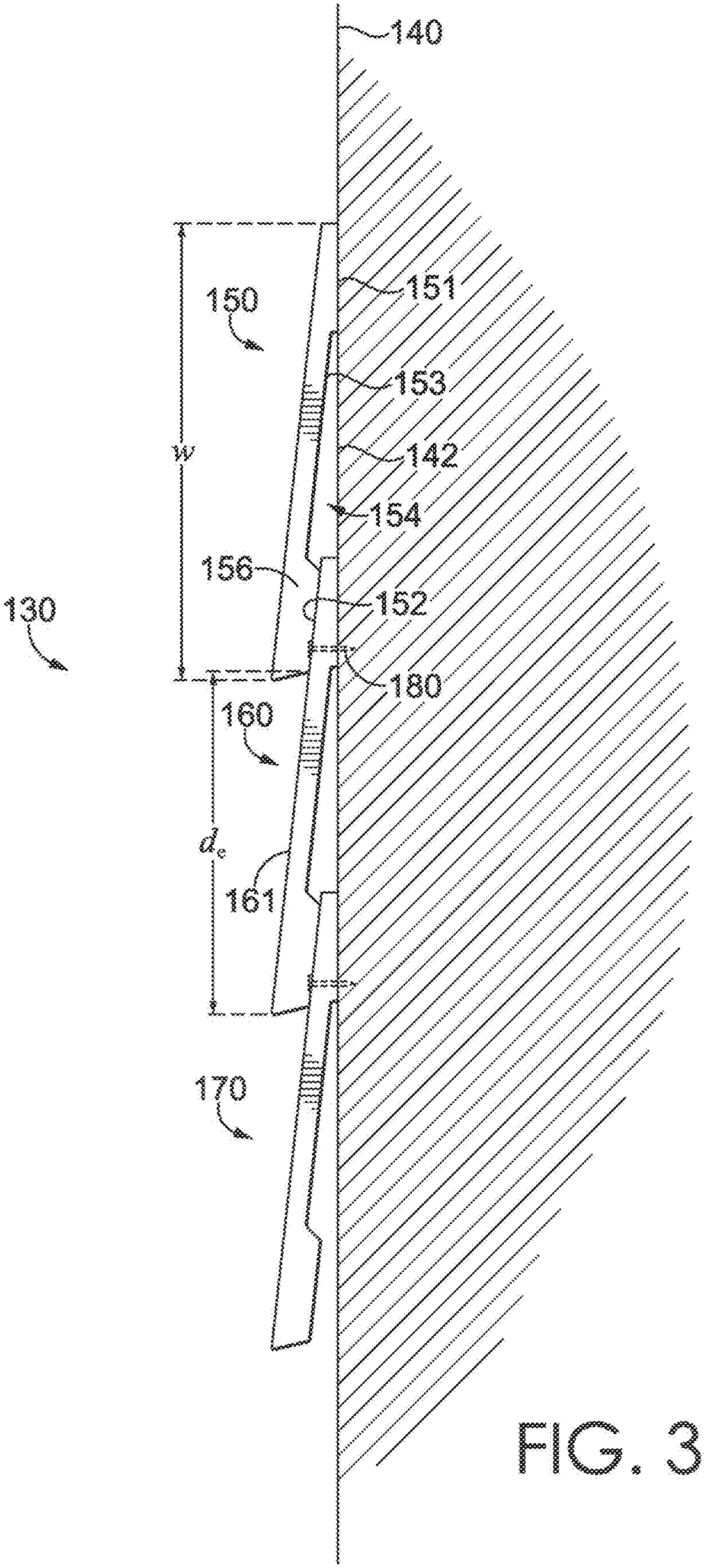
FIG. 3 is a side view of three polymeric-based building materials installed on an installation surface, with the first contacting surface of each of the three polymeric-based building materials contacting the installation surface and the second contacting surface of two of the three polymeric-based building materials contacting an outer surface of an adjacent polymeric-based building material, in accordance with aspects hereof.

FIG. 3 depicts one example where a plurality of polymeric-based building materials 130 are installed on an installation surface 140. In aspects, the installation surface 140 can be an outer sidewall of any type of commercial or residential structure where overlapping siding is desired. Each of the plurality of polymeric-based building materials 130 can exhibit any or all of the properties and parameters of the polymeric-based building material 100 discussed above with respect to FIGS. 1 and 2.

As can be seen in FIG. 3, a first polymeric-based building material 150 is positioned so that a first contacting surface 151 is flush, or planarly abuts, with the installation surface 140, while a second contacting surface 152 extends out at an angle with respect to the first contacting surface 151 and seamlessly interfaces, e.g., planarly abuts, with an outer surface 161 of a second polymeric-based building material 160. As discussed above, to facilitate the seamless interface between the second contacting surface 152 of the first polymeric-based building material 150 and the outer surface 161 of a second polymeric-based building material 160, the second contacting surface 152 can be substantially parallel to the outer surface 161. Further, the second contacting surface 152 and the outer surface 161 can be similarly angled with respect to the first contacting surface 151, as can be seen in FIG. 2. In aspects, by having the second contacting surface 152 of the first polymeric-based building material 150 seamlessly interfacing, e.g., planarly abutting, with an outer surface 161 of a second polymeric-based building material 160, a force can be applied over a broad distribution of the abutting surfaces, compared to a more narrowly focused contacting interface, such as with conventional products that do not have substantially parallel interacting surfaces. In such a scenario, the planarly abutting surfaces described herein experience less wear, as the force is distributed over a greater surface area compared to certain conventional products that have a more narrowly focused contacting surface, as discussed above.

In aspects, such as that depicted in FIG. 3, the polymeric-based building materials can be configured to be installed in an overlapping manner. For instance, as discussed above, the first polymeric-based building material 150 is installed to overlap with the second polymeric-based building material 160. In such an aspect, the outer surface 161 of the second polymeric-based building material 160 is not entirely exposed, with an exposed portion having a distance $d_e$. In various aspects, the distance $d_e$ of the exposed portion 162 can be about 2.5 inches to about 9 inches, about 3 inches to about 8.5 inches, or about 3.5 inches to about 8 inches; or about 4 inches, about 5 inches, about 6 inches, about 7 inches, or about 8 inches.

As can be further seen in the aspect depicted in FIG. 3, the overlapping portion of the polymeric-based building materials can be utilized to insert a securing fastener through one or more of the overlapping polymeric-based building materials and into the installation surface 140. For example, the overlapping of a portion of the second polymeric-based building material 160 with the second contacting portion 156 of the first polymeric-based building material 150 can be utilized to obscure a securing fastener, e.g., securing fastener 180, inserted through the second polymeric-based building material 160 and into the installation surface 140.

Like the polymeric-based building material 100 described above with respect to FIGS. 1 and 2, each of the plurality of polymeric-based building materials 130 include a recessed portion on the respective inner surfaces. For instance, as can be seen in the aspect depicted in FIG. 3, the inner surface 153 of the first polymeric-based building material 150 includes a recessed portion 154 positioned between the first contacting portion 155, having the first contacting surface 151, and the second contacting portion 156, having the second contacting surface 152.

As seen in FIG. 3, the recessed portions, e.g., the recessed portion 154, are spaced apart from the installation surface 140. However, the exposed portion 142 of the installation surface 140 remains protected from the elements due to the seamless interface, e.g., the planar abutting, between the first contacting surface 151 and the installation surface 140 and/or the seamless interface, e.g., the planar abutting, between the second contacting surface 152 and the outer surface 161 of the second polymeric-based building material 160.

It should be understood that the recessed portion 154 of the first polymeric-based building material 150 depicted in FIG. 3 and/or the recessed portion 114 of the polymeric-based building material 100 depicted in FIGS. 1 and 2 are just one example of a recessed portion on an inner surface contemplated herein. In aspects, a recessed portion can be any shape, with the parameters of the first and second contacting portions of the inner surface and of the outer surface described herein being maintained in such alternative aspects. FIGS. 4A-4E provide various structural designs for the recessed portion while maintaining the parameters of the first and second contacting portions of the inner surface and of the outer surface described herein at least with respect to FIGS. 1-3.

Figure 4A:
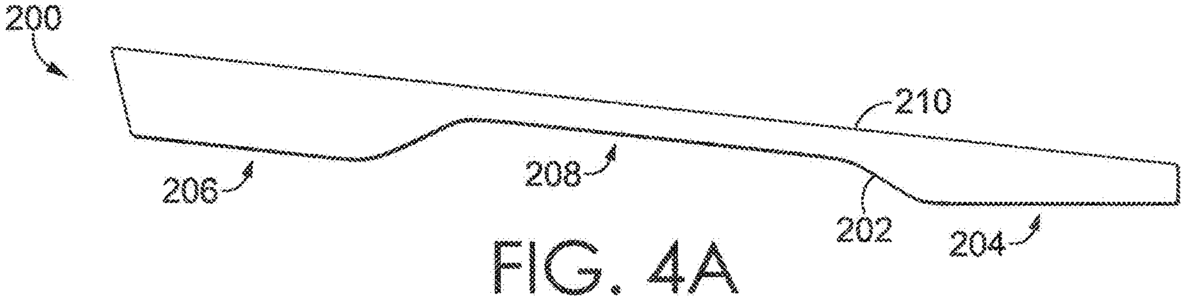
FIGS. 4A-4E are side views depicting other example polymeric-based building materials, with each polymeric-based building material having, at least, a different shape to a recessed portion that is positioned between first and second contacting portions on the inner surface, in accordance with aspects hereof.

For example, FIG. 4A depicts one example polymeric-based building material 200 that includes an inner surface 202 with an alternately-shaped recessed portion 208 positioned between a first contacting portion 204 and a second contacting portion 206, with the inner surface 202 opposing the outer surface 210.

Figure 4B:
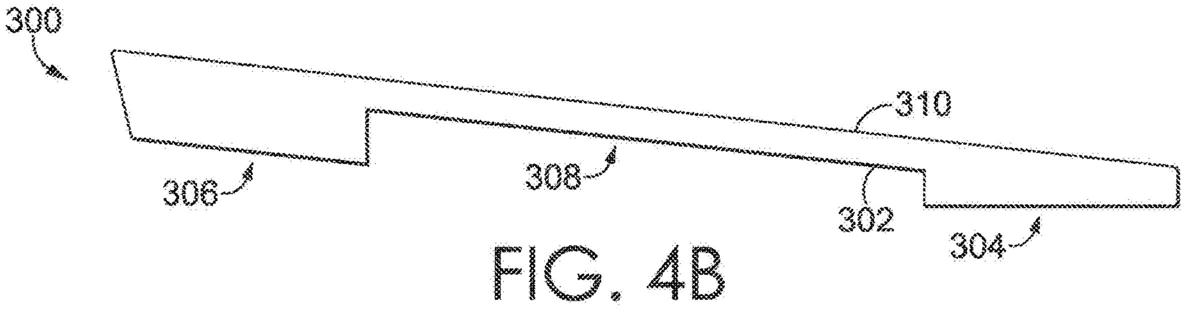

FIG. 4B depicts another example polymeric-based building material 300 that includes an inner surface 302 with an alternately-shaped recessed portion 308 positioned between a first contacting portion 304 and a second contacting portion 306, with the inner surface 302 opposing the outer surface 310.

Figure 4C:
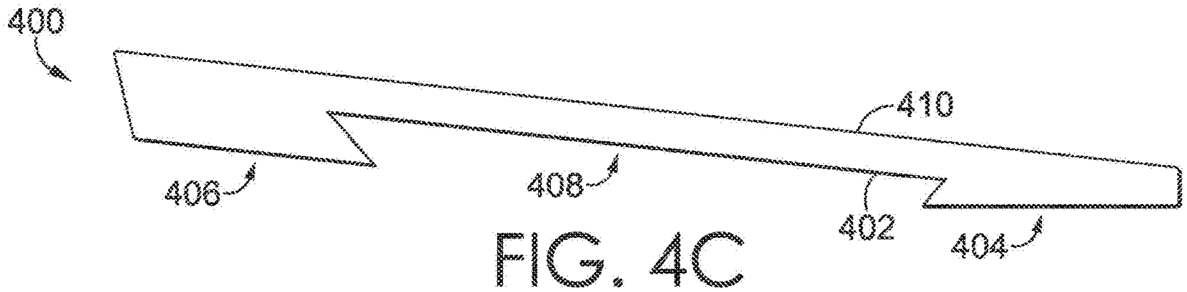

FIG. 4C depicts yet another example polymeric-based building material 400 that includes an inner surface 402 with an alternately-shaped recessed portion 408 positioned between a first contacting portion 404 and a second contacting portion 406, with the inner surface 402 opposing the outer surface 410.

Figure 4D:
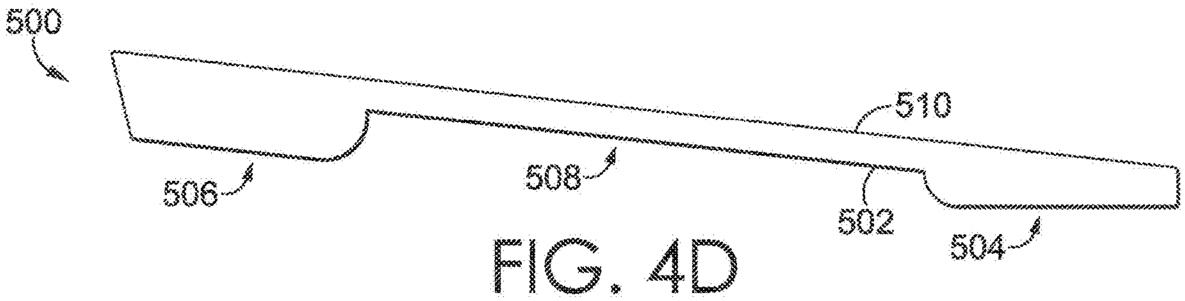

FIG. 4D depicts another example polymeric-based building material 500 that includes an inner surface 502 with an alternately-shaped recessed portion 508 positioned between a first contacting portion 504 and a second contacting portion 506, with the inner surface 502 opposing the outer surface 510.

Figure 4E:
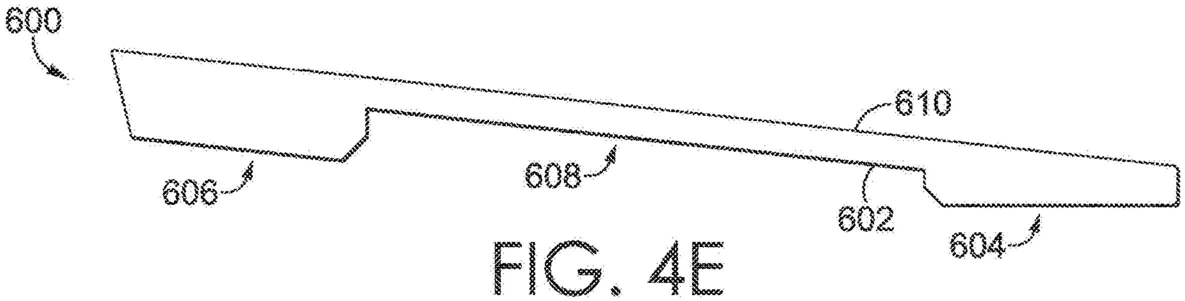

FIG. 4E depicts yet another example polymeric-based building material 600 that includes an inner surface 602 with an alternately-shaped recessed portion 608 positioned between a first contacting portion 604 and a second contacting portion 606, with the inner surface 602 opposing the outer surface 610.

In certain aspects as discussed above, the polymeric-based building materials optionally comprise a polymeric composition that is configured to further enhance the dimensional stability of the building materials disclosed herein.

In various aspects, the polymeric composition can include high-density polyethylene (HDPE); low-density polyethylene (LDPE); polyvinyl chloride (PVC); polypropylene (PP); acrylonitrile; alpha-olefins such as ethylene, propylene, etc.; chlorinated monomers such as vinylidene, dichloride; acrylate monomers such as acrylic acid, methylacrylate, methylmethacrylate, acrylamide, hydroxy-ethyl acrylate, and others; styrenic monomers such as styrene, alpha methyl styrene, vinyl toluene, etc.; vinyl acetate; and other commonly available ethylenically unsaturated monomer compositions, or a combination thereof. In a preferred aspect, the polymeric composition can include polyvinyl chloride (PVC).

In certain aspects, the polymeric composition can be present in the polymeric-based building materials in an amount of about 20 wt. % to about 80 wt. %, about 30 wt. % to about 70 wt. %, or about 35 wt. % to about 65 wt. %.

In further aspects as discussed above, the polymeric-based building material may also include one or more additives that may enhance the dimensional stability of the building materials, as compared to a polymeric-based material alone. In aspects, such additives can be in fiber form or in non-fiber form. In one aspect, such an additive, e.g., Wollastonite, may be present in the polymeric composition in an amount between about 20 wt. % to about 60 wt. %, or about 25 wt. % to about 55 wt. %. In certain aspects, the Wollastonite and/or other additive providing dimensional stability may be present in fiber form. In such aspects, the Wollastonite and/or other additive can have a width and a length that is longer than the width. In certain aspects, the Wollastonite and/or other additive can exhibit an aspect ratio (length to width) of about 3:1 or greater, about 8:1 or greater, about 20:1 or greater, or about 100:1 or greater. In the same or alternative aspects, the Wollastonite and/or other additive can exhibit an aspect ratio (length to width) of between about 1.2:1 to about 3:1, about 1.2:1 to about 8:1, about 1.2:1 to about 20:1, or about 1.2:1 to about 100:1.

The polymeric-based building material can optionally include additional additives, such as foaming agents, lubricants, fiber and/or non-fiber fillers, or other convenient processing additives for performing an extrusion manufacturing process. In one aspect, wood fiber may be utilized in an amount of about 10 wt. % to about 20 wt. %, or up to about 15 wt. %.

In aspects, when incorporating certain additives, e.g., fiber and/or non-fiber fillers, into a resin or polymeric composition, and prior to formation of the ultimate building material, it may be beneficial to include a processing additive, such as a compatibilizer and/or coupling agent. In such aspects, such a processing additive may facilitate the efficient integration of the filler or other additive into the polymeric composition or resin, and/or improve the processability of a particular formulation. For instance, in one aspect, an example processing additive, a maleic anhydride grafted styrene acrylonitrile copolymer, can be added to certain formulations in order to efficiently incorporate a filler or other additive into the resin. In aspects, the maleic anhydride grafted styrene acrylonitrile copolymer (MA-g-SAN) can be represented by formula I below.

(I)

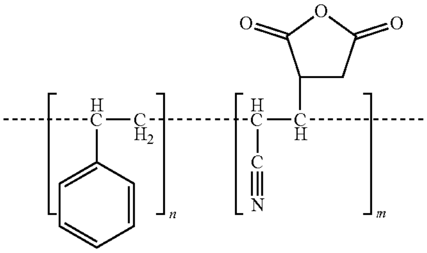

In aspects, the maleic anhydride grafted styrene acrylonitrile copolymer can include about 50 wt. % to about 90 wt. % polystyrene, about 60 wt. % to about 80 wt. % polystyrene, or about 70 wt. % polystyrene. In the same or alternative aspects, the maleic anhydride grafted styrene acrylonitrile copolymer can include about 0 wt. % to about 60 wt. % polyacrylonitrile, about 10 wt. % to about 50 wt. % polyacrylonitrile, about 20 wt. % to about 40 wt. % polyacrylonitrile; or about 30 wt. % polyacrylonitrile. In various aspects, the maleic anhydride grafted styrene acrylonitrile copolymer can include about 10 wt. % to about 70 wt. % maleic anhydride, about 15 wt. % to about 60 wt. % maleic anhydride, or about 20 wt. % to about 50 wt. % maleic anhydride.

Without being bound by any particular theory, it is believed that the maleic anhydride moiety in MA-g-SAN may electrostatically interact with, or couple with, a charged chemical moiety or species associated with an additive or filler, e.g., Wollastonite, while the styrene acrylonitrile copolymer backbone may be miscible with various resin matrices, e.g., a PVC resin matrix, thereby resulting in more efficient fusion of the filler or additive into the resin and an increase in process-ability of the formulation.

In various aspects, the polymeric-based building materials can be manufactured using an extrusion process, such as a foam extrusion process. In certain aspects, the process can include an aging step prior to the extrusion process, where the polymeric composition or resin component is dry mixed with at least the additives, e.g., Wollastonite or other additives, and aged for at least 24 hours prior to the extrusion process. Without being bound by any particular theory it is believed that such a dry-aging can facilitate ionic bonding between the additives and the polymeric composition or resin component to further promote dimensional stability of the extruded material.

In aspects, generally, the extrusion process used to form the polymeric-based building materials disclosed herein can be any convenient extrusion process, including a foam extrusion process. In one aspect, a breaker plate may be utilized so that the molten polymeric-based building materials passes through the breaker plate or screen prior to entering the die. Without being bound by any particular theory, in certain aspects, where a fiber additive is used, such as Wollastonite fibers, it is believed that the use of a breaker plate or screen can facilitate orienting at least a portion of the fiber additive in the direction of extrusion. As discussed above, in certain aspects, incorporating the one or more additives, such as Wollastonite fibers, into the polymeric-based building material can provide enhanced dimensional stability to the polymeric-based building material. For instance, having at least a portion of additive fibers, e.g., Wollastonite fibers, present in the polymeric-based building material that are aligned in the direction of extrusion may provide additional structural support along the length of the material, thereby compensating for the reduced amount of polymeric material in the product, e.g., due to the recessed portion described herein. In aspects, having at least a portion of additive fibers, e.g., Wollastonite fibers, present in the polymeric-based building material that are aligned in the direction of extrusion provides a level of dimensional stability greater than that achieved with a similarly shaped building material in the absence of Wollastonite fibers and/or other additive fibers.

Figure 5:
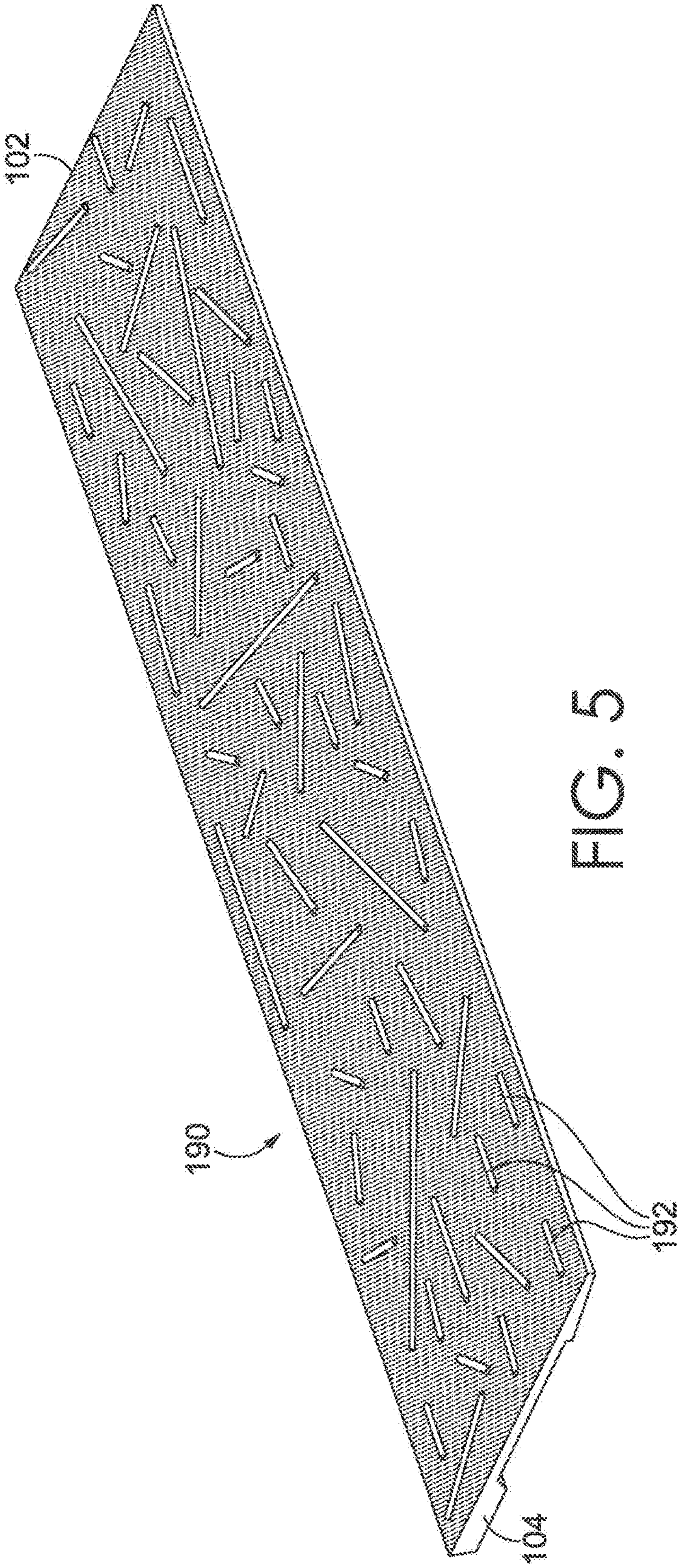
FIG. 5 is a top and side perspective view of the polymeric-based building material of FIG. 1 with a portion removed along the cut line 5 of FIG. 1, particularly showing that at least a portion of the additives present in the polymeric-based material are aligned such that the additive's length or long axis extends in a direction that is substantially similar to the direction of extension of the polymeric-based building material between the left and right side, in accordance with aspects hereof.

FIG. 5 is a schematic depiction of the orientation of a portion of fiber additives in the cross-sectional view of the polymeric-based building material 100 of FIG. 1, along cutline 5. As can be seen in the cross-section depicted in FIG. 5, the polymeric-based building material 100 includes an additive, such as a fiber additive 190, where at least a portion 192 of the fiber additive 190 extends in the direction of extrusion, or the direction of extension between the right end 102 and the left end 104.

In various aspects, to increase extreme temperature performance of the polymeric-based building materials disclosed herein and to reduce shrinkage, the extruded building material may be annealed for a period of time prior to installation. In certain aspects, the extruded building materials can be annealed by exposure to an elevated temperature for a period of time sufficient to relieve internal stresses of the material to a level that will minimize subsequent stress shrinkage. For example, in various aspects, the extruded building materials can be annealed by exposure to a temperature ranging from about 140° F. to about 180° F. for a period of about 4 hours to about 24 hours. In various aspects, the polymeric-based building materials can be annealed when positioned vertically, that is, with one or both of the left side and right sides being substantially parallel to the ground.

Figure 6:
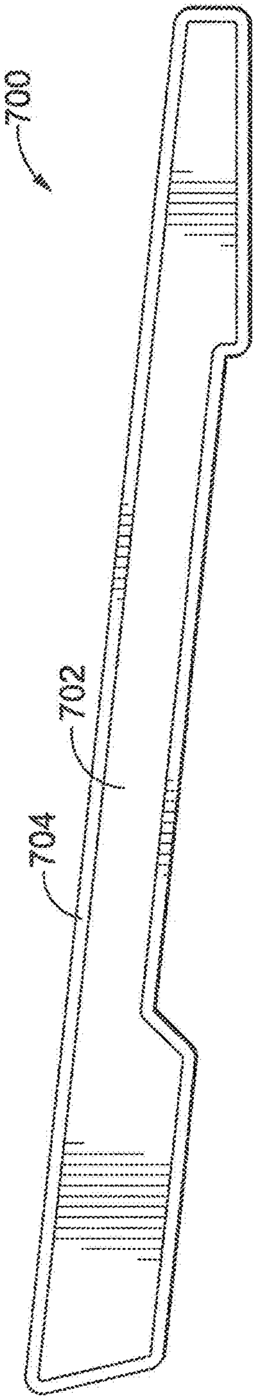
FIG. 6 is a side-view of another example polymeric-based building material, particularly showing a core material and cap material, in accordance with aspects hereof.
Figure 8:
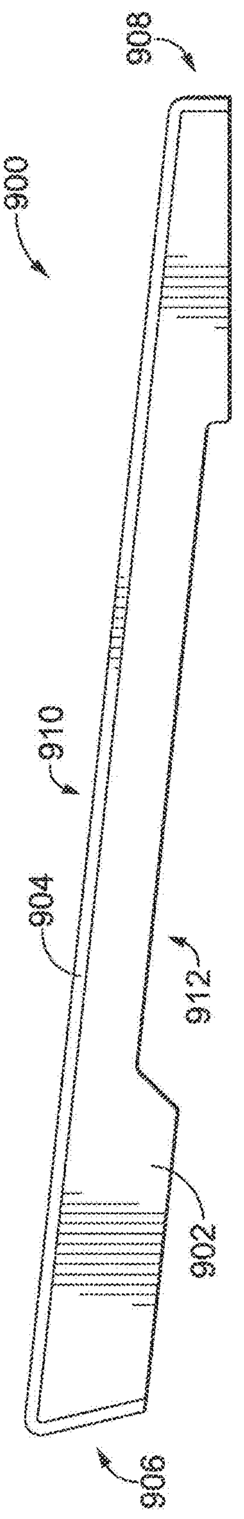
FIG. 8 is a side-view of yet another example polymeric-based building material, particularly showing a core material and cap material, in accordance with aspects hereof.
Figure 9:
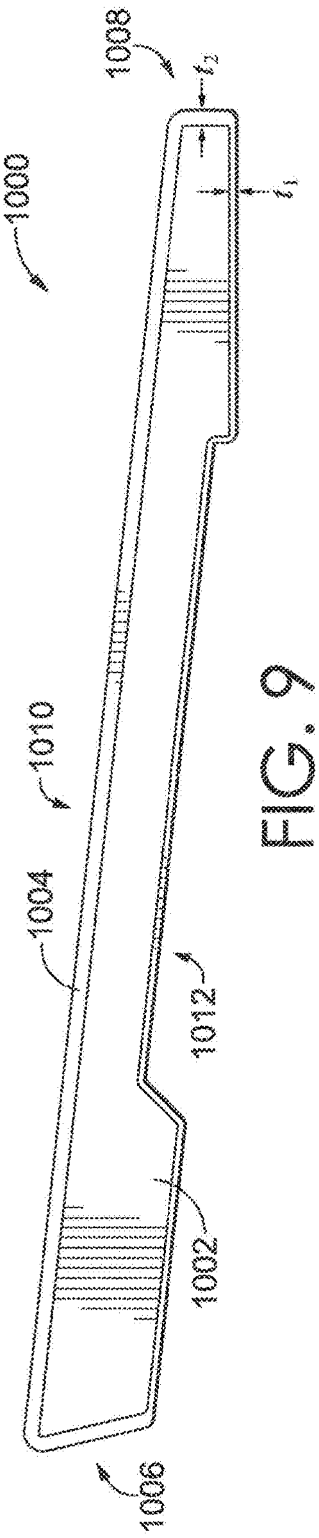
FIG. 9 is a side-view of another example polymeric-based building material, particularly showing a core material and cap material, in accordance with aspects hereof.

In various aspects, the polymeric-based building materials can be co-extruded with a cap material, e.g., to further increase the durability of the building materials. FIG. 6 depicts a capped polymeric-based building material 700. As can be seen in FIG. 6, the capped polymeric-based building material 700 can include a core material 702 and a cap material 704 that provides a cap or coating layer outside of the core material 702. In various aspects, the cap material 704 may or may not cover the left and/or right side of the capped polymeric-based building material 700. In aspects, the capped polymeric-based building material 700 can include any or all of the properties of the polymeric-based building material 100 discussed above with respect to FIGS. 1 and 2. It should be understood that the capped polymeric-based building material 700 depicted in FIG. 6 is just one example of a capped polymeric-based building material and that other variations, such as variations on the size and shape of the core material 702 and/or the cap material 704, are contemplated by the disclosure herein. FIGS. 8 and 9 depict two, non-limiting alternative aspects of a capped polymeric-based building material.

As can be seen in FIG. 8, a capped polymeric-based building material 900 is depicted, where the cap material 904 covers a core material 902 and may be present on a top end 908, a bottom end 906, and an outer surface 910, but the cap material 904 may be absent from an inner surface 912. In aspects, the capped polymeric-based building material 900 can include any or all of the properties of the polymeric-based building material 100 discussed above with respect to FIGS. 1 and 2.

As can be seen in FIG. 9, a capped polymeric-based building material 1000 is depicted, where the cap material 1004 covers the core material 1002 and is present on the top end 1008, the bottom end 1006, the outer surface 1010, and the inner surface 1012, with a reduced thickness $t_1$ of the cap material 1004 on the inner surface 1012 compared to the thickness $t_2$ of the cap material 1004 on the top end 1008, the bottom end 1006, and/or the outer surface 1010 as depicted in FIG. 9. In one aspect, the thickness $t_1$ of the cap material 1004 on the inner surface 1012 may be about 0.05 inches to about 0.2 inches, or may be about 0.125 inches. In aspects, the capped polymeric-based building material 1000 can include any or all of the properties of the polymeric-based building material 100 discussed above with respect to FIGS. 1 and 2.

In various aspects, the cap material can include high-density polyethylene (HDPE), low-density polyethylene (LDPE), polyvinyl chloride (PVC), polypropylene (PP), nylon, or a combination thereof. In one aspect, the cap material can include one or more of high-density polyethylene (HDPE), low-density polyethylene (LDPE), polyvinyl chloride (PVC), polypropylene (PP), nylon, blended with one or more other convenient polymers suitable for use as an outer layer for a building material. In aspects, optional functional additives can be added to the cap material, such as one or more functional mineral-based additives. In various aspects, the capped polymeric-based building materials 700, 900, and/or 1000 of FIGS. 6, 8, and 9, respectively, can be formed by a co-extrusion process.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A polymeric-based building material, comprising:

a top end;

a bottom end positioned opposite the top end and spaced apart from the bottom end;

a left end extending from the top end to the bottom end;

a right end, the right end positioned opposite the left end, and extending from the top end to the bottom end, wherein the left end is spaced apart from the right end;

an outer surface extending from the top end to the bottom end and from the left end to the right end, wherein the outer surface defines a first horizontal plane; and an inner surface extending from the top end to the bottom end and from the left end to the right end;

wherein the polymeric-based material comprises an polymeric resin including a fiber additive, and wherein each of the fiber additive has a long axis and at least a portion of the fiber additive are oriented such that the long axis extends in a direction that is substantially similar to the direction of extension between the right end and the left end of the polymeric-based building material.

2. The polymeric-based building material according to claim 1, wherein the inner surface includes a first contacting portion, a second contacting portion, and a recessed portion positioned between the first contacting portion and the second contacting portion, wherein the second contacting portion has a second contacting surface that defines a second horizontal plane that is substantially parallel to the first horizontal plane of the outer surface.

3. The polymeric-based building material according to claim 2, wherein a maximum thickness $t_r$ between the inner surface and the outer surface in the recessed portion is less than a maximum thickness $t_2$ between the inner surface and the outer surface in the second contacting portion.

4. The polymeric-based building material according to claim 3, wherein a ratio $t_r$:$t_2$ is between 1:1.1 and 1:4.

5. The polymeric-based building material according to claim 3, wherein the maximum thickness $t_r$ between the inner surface and the outer surface in the recessed portion is between 0.1 inches and 1 inch.

6. The polymeric-based building material according to claim 1, further comprising a cap affixed to at least a portion of the outer surface.

7. The polymeric-based building material according to claim 6, wherein the cap has a thickness $t_1$, wherein $t_1$ is in an inclusive range of about 0.05 inches to about 0.2 inches.

8. The polymeric-based building material according to claim 6, wherein the cap comprises high-density polyethylene (HDPE), low-density polyethylene (LDPE), polyvinyl chloride (PVC), polypropylene (PP), or nylon.

9. The polymeric-based building material according to claim 6, wherein the cap is also affixed to at least a portion of the inner surface.

10. The polymeric-based building material according to claim 1, wherein the fiber additive are present in an amount of 20 wt. % to 60 wt. % of the dry-mixed polymeric resin.

11. The polymeric-based building material according to claim 10, wherein the fiber additive comprises Wollastonite.

* * * * *